Nov. 8, 1932.  E. W. HOPE  1,886,954

HONEY EXTRACTOR

Filed Sept. 23, 1929

Inventor
Earl W. Hope
By Chas. J. Williamson
Attorney

Patented Nov. 8, 1932

1,886,954

UNITED STATES PATENT OFFICE

EARL W. HOPE, OF MEDINA, OHIO, ASSIGNOR TO THE A. I. ROOT COMPANY, OF MEDINA, OHIO, A CORPORATION

HONEY EXTRACTOR

Application filed September 23, 1929. Serial No. 394,625.

An object of my invention is to provide a centrifugal honey extractor which will combine at once the qualities of high efficiency in respect of the quantity of honey removed from the combs, extreme simplicity and compactness and the minimum of power for operating it and which in particular may be easily hand-operated.

My invention consists in whatever is described by or is included within the terms or scope of the appended claims.

In the drawing:—

Figure 1:
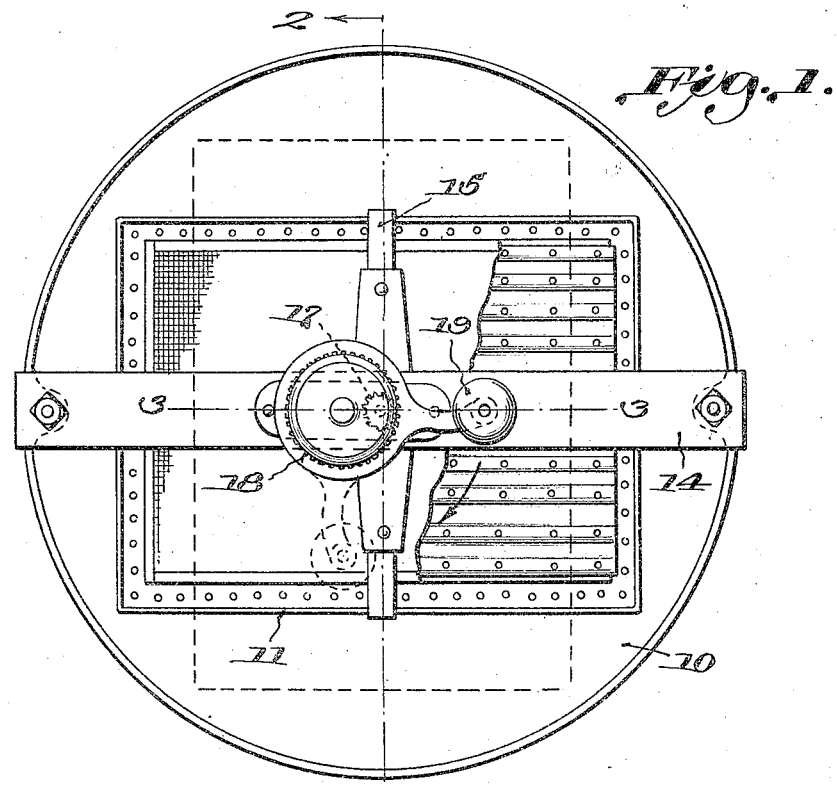
Fig. 1 is a top plan view of one embodiment of my invention.
Figure 2:
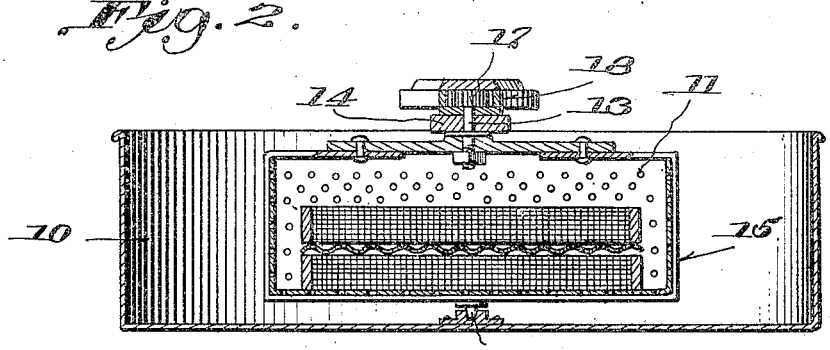
Fig. 2 is a vertical section.
Figure 3:
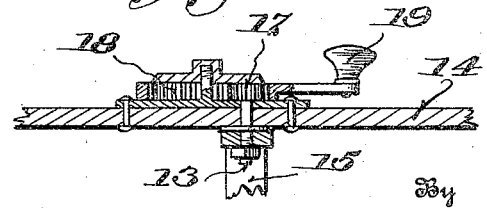
Fig. 3 is a fragmentary sectional view on line 3—3 of Fig. 1.

In making my invention, I have embodied it in that type of centrifugal honey extractor in which the comb is in a horizontal position in the extractor and rotates about a vertical axis. I have discovered that by rotating a comb when it is a plane at right angles to the axis of rotation and the axis of rotation is central or substantially central of the comb, all of the honey in the comb except a very small percentage at the center of rotation can be readily removed. In tests that have been made with one type of machine, it has been found that all but about five per cent of the honey at the center of rotation is removed. The parts of such an extractor may be few and the construction thus be extremely simple and compact and one that may be operated by hand and on a bench. The essential parts of such an extractor are the pan or tub, a basket with perforated bottom and sides and end walls for receiving one or more frames of honey one above the other and simple means for supporting the basket to rotate about a vertical axis and for rotating it about such an axis.

The particular embodiment of the invention shown in the drawing includes a round pan or tub, 10, with bottom and side walls, but no top, say 10 or 14 inches deep, and of a diameter to permit the free revolution of an oblong basket, 11, of a size to hold in a horizontal position one or more conventional or standard combs in frames. The basket, 11, has bottom and side walls, but no top and bottom and sides are perforated to permit the outflow of honey as it is extracted from the comb. The basket at its longitudinal and transverse center has a vertical pivot which as shown in the drawing includes a shaft, 12, at the bottom that engages a bearing at the center of the tub bottom and a vertically alining shaft, 13, at the top which passes through a bearing in a horizontal diametrically extending bar, 14, secured to the top edge of the tub or pan. The two shafts are secured to and project from a strap, 15, which extends around the basket at top, bottom and sides and is suitably rigidly secured thereto. There is sufficient space below the upper part of the strap and the bottom of the basket and between the strap at either side and the basket ends to permit the frame containing the honey to be slid endwise into the basket, when the basket lengthwise is crosswise of the top bar, 14.

Above the top bar, 14, the upper shaft has a pinion, 17, with which meshes the teeth of an internal gear, 18, mounted to rotate freely on a shaft rising from the cross-bar, 14, and having a crank or handle, 19, by which it may be revolved by hand.

The comb basket preferably has a depth to hold several combs placed one above the other, say two, three or four, the lower-most comb lying on the bottom of the basket and to separate the combs a separator, 19, is used. Such separator has a construction that provides a horizontal space between adjacent combs for the honey escaping from an upper comb to escape or pass off. Such separating means may be given various forms to this end. Preferably as a simple and easily handled form, a sheet metal plate that is corrugated to provide horizontal channels is used, as shown in the drawing. Said plate is also perforated for the down or outflow of honey from the comb above.

As I have already indicated, my invention may be embodied in different constructions, which will utilize the fundamental idea of the invention of a comb carrier or support which has an axis of rotation at right angles to the plane of the comb and which passes through the comb at or substantially at the center thereof.

What I claim is:—

1. A centrifugal honey extractor, comprising a circular open pan having a bar secured diametrically across its top and having a bearing centrally located on its bottom, a second bearing in said bar in alinement with said first-mentioned bearing, a horizontal rectangular open topped basket of perforated material to receive a honey comb, a strap passed around said basket at its middle, stub shafts carried by said strap and engaging said bearings, and manual means to rotate the upper one of said shafts.

2. A centrifugal honey extractor, comprising a circular open pan having a bar secured diametrically across its top and having a bearing centrally located on its bottom, a second bearing in said bar in alinement with said first-mentioned bearing, a horizontal rectangular open topped basket of perforated material adapted to receive superposed honey combs, a perforated corrugated plate to separate the honey combs, a strap surrounding said basket at its middle, stub shafts carried by said strap to engage said bearings and gearing on the upper side of said bar to rotate the basket through the upper one of said shafts.

In testimony whereof I hereunto affix my signature.

EARL W. HOPE.